No. 625,857. Patented May 30, 1899.
L. SWARM.
HAY RICKER.
(Application filed Jan. 28, 1899.)
(No Model.)
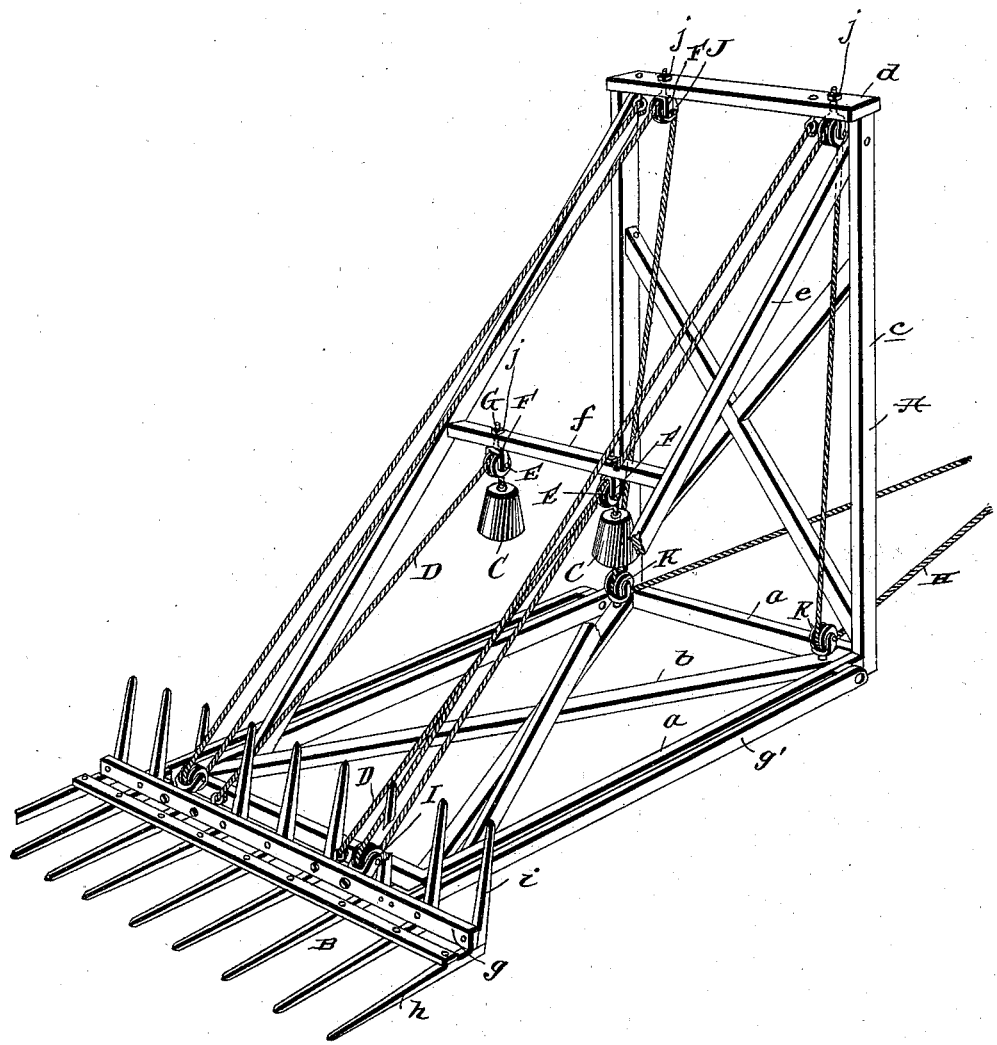
Witnesses:
Inventor
Levi Swarm
By James J. Shuhy
Attorney

UNITED STATES PATENT OFFICE.

LEVI SWARM, OF ST. JAMES, ILLINOIS.

HAY-RICKER.

SPECIFICATION forming part of Letters Patent No. 625,857, dated May 30, 1899.

Application filed January 28, 1899. Serial No. 703,737. (No model.)

*To all whom it may concern:*

Be it known that I, LEVI SWARM, a citizen of the United States, residing at St. James, in the county of Fayette and State of Illinois, have invented new and useful Improvements in Hay-Rickers, of which the following is a specification.

My invention relates to hay rickers or stackers; and it consists in the peculiar and advantageous construction hereinafter described, and particularly pointed out in the claim appended.

In the accompanying drawing the figure is a perspective view of a ricker constructed in accordance with my invention.

Referring by letter to said drawing, A is the main frame of the ricker, which is designed to rest upon the ground adjacent to the point at which the rick is to be built. It is constructed of wood and comprises a rectangular base $a$, having diagonal braces $b$, suitably-braced uprights $c$, rising from the rear end of the base and having their upper ends connected by a cross-bar $d$, and inclined braces $e$, interposed between the forward portions of the side bars of the base $a$ and the uprights $c$ and connected at an intermediate point of their length by a cross-bar $f$. Such frame is strong and forms a rigid support for the hay-lifting fork and the appurtenances thereof and at the same time is very light and is consequently adapted to be conveniently transported from place to place, which is a desideratum.

B is the hay-lifting fork, which is also of wood. The said fork has a head $g$ and arms $g'$, the latter being disposed at opposite sides of the frame-base $a$ and pivotally connected to the side bars of said base adjacent to the rear ends of the same, as shown, so as to enable the fork to swing up and down. The fork-head $g$ comprises two sets of tines $h$ $i$, disposed at right angles to each other, as illustrated. By reason of this when the fork is in its lowermost position the tines $h$ will rest flat on the ground and permit of hay being readily placed in the fork-head. Also when the fork is raised the two sets of tines will securely hold the hay, and when the fork reaches its uppermost position the set of tines $i$ will have assumed such a position as to permit the hay to slide from the fork-head upon the rick.

C are weights which are connected to the fork-head $g$ by cables D taking over pulleys E and have for their purpose to assist in the raising of the fork. The pulleys E are mounted in bails F, which have stems G, journaled in the frame-bar $f$ and secured thereto by nuts $j$. By virtue of this manner of connecting the said pulleys E to the frame they are enabled to adapt themselves to the direction in which the cables are moved, and thus prevent binding of the cables and at the same time lessen the friction incident to the movement of the same over the pulleys.

H are the cables to which a draft-animal is attached to raise the fork. These cables H are connected at one end to the cross-bar $d$ of the main frame, and they take around pulleys I on the fork-head $g$, over pulleys J on the frame-bar $d$, and under pulleys K, arranged on the braces $b$ adjacent to the rear end of the base $a$. The said pulleys I J K are mounted in bails F, having threaded stems G, and the stems of the bails carrying the pulleys I are journaled in the fork-head and secured thereto by nuts. The stems of the bails carrying the pulleys J are journaled in the bar $d$ and secured thereto by nuts, and the stems of the bails carrying the pulleys K are journaled in the braces $b$ and secured thereto by nuts. This manner of mounting the several pulleys is advantageous, because it enables them to accommodate themselves to the direction of movement of the cables, and thereby prevents binding and frictional wear of the same and at the same time renders the task of the draft-animal easier. It is also advantageous because it permits of the pulleys and the cables being readily connected to and disconnected from the main frame and the fork when desired.

The operation of the ricker is that common to the class of rickers having swinging forks— that is to say, the hay is placed in the fork-head while the same is on the ground and is elevated and discharged on the rick by raising the fork to an upright position, such raising of the fork being effected by a draft-animal hitched to the cables H. After the hay is discharged from the fork the draft-animal is backed until the fork-head reaches the ground, when the operation is repeated.

In some cases the parts entering into the main frame may be detachably connected together by means of bolts and nuts, so as to permit of the frame being readily taken apart for convenience in packing and transportation and as readily put together at the point of use. When the frame is thus constructed, the manner in which the pulleys are connected to the frame and fork-head will be found to be very advantageous because of the facility with which they may be removed.

Having thus described my invention, what I claim is—

The herein-described hay-ricker consisting essentially of the main frame made up of the rectangular base, the uprights rising from the rear end of the base and connected at their upper ends by a cross-bar $d$, the inclined braces connected at one end to the uprights adjacent to the upper ends thereof and at their opposite ends to the side bars of the base, and a cross-bar $f$ connecting said braces at an intermediate point of their length, the hay-lifting fork having the arms pivotally connected to the base of the frame and the head comprising two sets of tines disposed at an angle to each other, pulleys on the base and cross-bars $d\ f$ of the main frame, and a pulley on the fork-head; said pulleys being mounted in bails having stems journaled in the base and cross-bars $d\ f$ of the main frame and in the fork-head, respectively, and provided with threaded ends to receive nuts, a cable taking over the pulley on the bar $f$ and connected at one end to the fork-head and having a weight at its opposite end, and a cable connected to the cross-bar $d$ and taking around the pulley on the fork-head, the pulley on the bar $d$ and the pulley on the frame-base, substantially as specified.

In testimony whereof I have hereunto set my hand in presence of two subscribing witnesses.

LEVI SWARM.

Witnesses:
   H. H. STINE,
   LUCY STEIN.